United States Patent [19]
Hista

[11] Patent Number: 4,476,087
[45] Date of Patent: Oct. 9, 1984

[54] REACTOR BUILDING

[75] Inventor: Jean C. Hista, Versailles, France

[73] Assignee: Framatome, Courbevoie, France

[21] Appl. No.: 322,386

[22] Filed: Nov. 17, 1981

[30] Foreign Application Priority Data

Nov. 28, 1980 [FR] France .................. 80 25305

[51] Int. Cl.³ .................................. G21C 19/32
[52] U.S. Cl. ........................... 376/285; 376/293
[58] Field of Search .................. 376/285, 293, 296

[56] References Cited

U.S. PATENT DOCUMENTS

| | | | |
|---|---|---|---|
| 3,022,238 | 2/1962 | Kolflat | 376/293 |
| 3,899,391 | 8/1975 | Sulzer et al. | 376/293 |
| 3,986,367 | 10/1976 | Kalpins | 376/285 |
| 4,053,357 | 10/1977 | Pradhan et al. | 376/285 |
| 4,204,804 | 5/1980 | Woodger | 376/285 |

FOREIGN PATENT DOCUMENTS

| | | |
|---|---|---|
| 1207024 | 12/1965 | Fed. Rep. of Germany ...... 376/293 |
| 1965850 | 7/1971 | Fed. Rep. of Germany . |
| 2346727 | 4/1975 | Fed. Rep. of Germany . |
| 2214158 | 8/1974 | France . |
| 54-120384 | 9/1979 | Japan .................. 376/293 |
| 1086054 | 10/1967 | United Kingdom . |

*Primary Examiner*—Sal Cangialosi
*Attorney, Agent, or Firm*—Pearne, Gordon, Sessions, McCoy, Granger & Tilberry

[57] ABSTRACT

Reactor building comprising internal structures, whose stresses are independent of the deformations of the general floor and of the background effect due to the reference accident pressure, and process for producing the internal structures.

This reactor building comprises a confinement enclosure (4), internal structures (14) constituted by a slab (22) peripherally locked against the frustum-shaped member (12) of confinement enclosure (4) and resting on the general floor (8) by a peripheral supporting ring (23), a compressible layer (32) being provided between the general floor (8) and slab (22).

Application to the construction of the internal structures of a reactor building.

8 Claims, 5 Drawing Figures

REACTOR BUILDING

BACKGROUND OF THE INVENTION

The present invention relates to a reactor building having internal structures, whose stresses are independent on the deformations of the general floor. It also relates to a process for producing the internal structures.

In general terms, it is known that the building in which a nuclear reactor is installed, called the reactor building, comprises a confinement enclosure within which are arranged structures, called internal structures, which support the components of the primary circuit. These structures comprise a floor, called the internal structure floor, a structure called the vessel shaft which surrounds and supports the reactor vessel, and hot cells positioned around the vessel shaft. The confinement enclosure is sealed by a soft steel covering, called a skin. The confinement enclosure prevents any leakage of radioactive substance in the case of an accident and resists the pressure and thermal stresses resulting from an accidental fracture of the primary or secondary circuits. The confinement enclosure is constituted by a floor, called the general floor, a cylindrical skirt erected on the general floor and a dome sealing the upper part of the skirt. Reactor buildings are known for which the stresses in the internal structures are a function of the deformations of the general floor.

BRIEF SUMMARY OF THE INVENTION

The invention relates to a reactor building which obviates the above disadvantages by making the stresses in the internal structures independent of the deformations of the general floor. To this end, the reactor building according to the invention has a space between the general floor and the internal structure floor.

More specifically, the present invention relates to a reactor building constituted by a confinement enclosure in which are positioned by a known centering means the internal structures, said confinement enclosure comprising a cylindrical skirt, whose upper part is sealed by a dome and erected on the general floor, the internal structures being constituted by the internal structure floor, a concrete cylinder called the vessel shaft located substantially in the center of the internal structure floor, and hot cells, wherein the lower part of the internal structure floor rests on the general floor by means of a peripheral support ring, a space being provided between the general floor and the internal structure floor.

The space between the general floor and the internal structure floor makes it possible to absorb the relative deformations tending to move the general floor towards the internal structure floor. Thus, the stresses in the internal structures are rendered independent of deformations of the general floor.

The problem is to cast the concrete of the internal structure floor, whilst providing the said space in the latter in such a way that the latter only rests on the general floor by the peripheral support ring. This problem is solved by the present invention.

According to a first embodiment, the space is obtained by a compressible layer placed over the entire circular surface within the peripheral support ring.

The internal structure floor is concreted in two stages. Firstly, a peripheral ring is cast, which does not cover the surface facing the vessel shaft. A set of shims is provisionally installed beneath the well shaft to prevent the exhaustion of the deformation capacity of the compressible layer during the construction work. These shims are deposited by jacking as soon as the internal structures have acquired a sufficient inertia to be self-supporting on the peripheral supporting ring. A compressible cushion is fitted to the central part of the general floor facing the well shaft after the shims have been removed from the latter. That part of the internal structure floor facing the well shaft can then be concreted. Waiting fittings are provided at the bottom of the vessel shaft skirt for joining together the two structures.

According to a second embodiment of the invention, the reactor building comprises three slabs positioned between the general floor and the internal structure floor, the preslabs resting on the general floor by at least three bearing points and covering the entire circular surface located within the peripheral supporting ring, with the exception of that part of the general floor facing the vessel shaft, a compressible layer being placed above the preslabs and a non-reinforced cement mortar cover protects the compressible layer during the formation of the internal structure floor, a venting system connecting the free space to the atmosphere of the confinement enclosure.

In the case of this second embodiment, it is indispensible to have a compressible layer above the preslabs in order to ensure that the stresses in the internal structures are independent from the deformations of the general floor. Thus, without the said layer, the preslabs resting on the general floor by at least three bearing points and covering the entire circular surface within the peripheral supporting ring would transmit the deformations of the general floor to the internal structures.

According to a third embodiment of the invention, the space between the general floor and the internal structure floor can be obtained by means of large preslabs having the shape of a ring sector and able to support their own weight, as well as all or part of the fresh concrete of the internal structure floor. In this way, a free space is formed in the internal structure floor. In this embodiment, like in the preceding embodiment, a second object of the invention is to prevent the pressure effect in the case of an accident on the internal structure floor. To this end, a venting system connects the free space to the atmosphere of the confinement enclosure.

Thus, according to this third embodiment the preslabs bear externally on the general floor and internally on the provisional shims, so as to define a space between the general floor and the internal structure floor, a venting system connecting the free space to the confinement enclosure atmosphere.

For this embodiment, the space provided in the internal structure floor is constituted by the free space between the preslabs and the general floor. Thus, the compressible layer existing in the case of the two previous embodiments is not indispensible.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
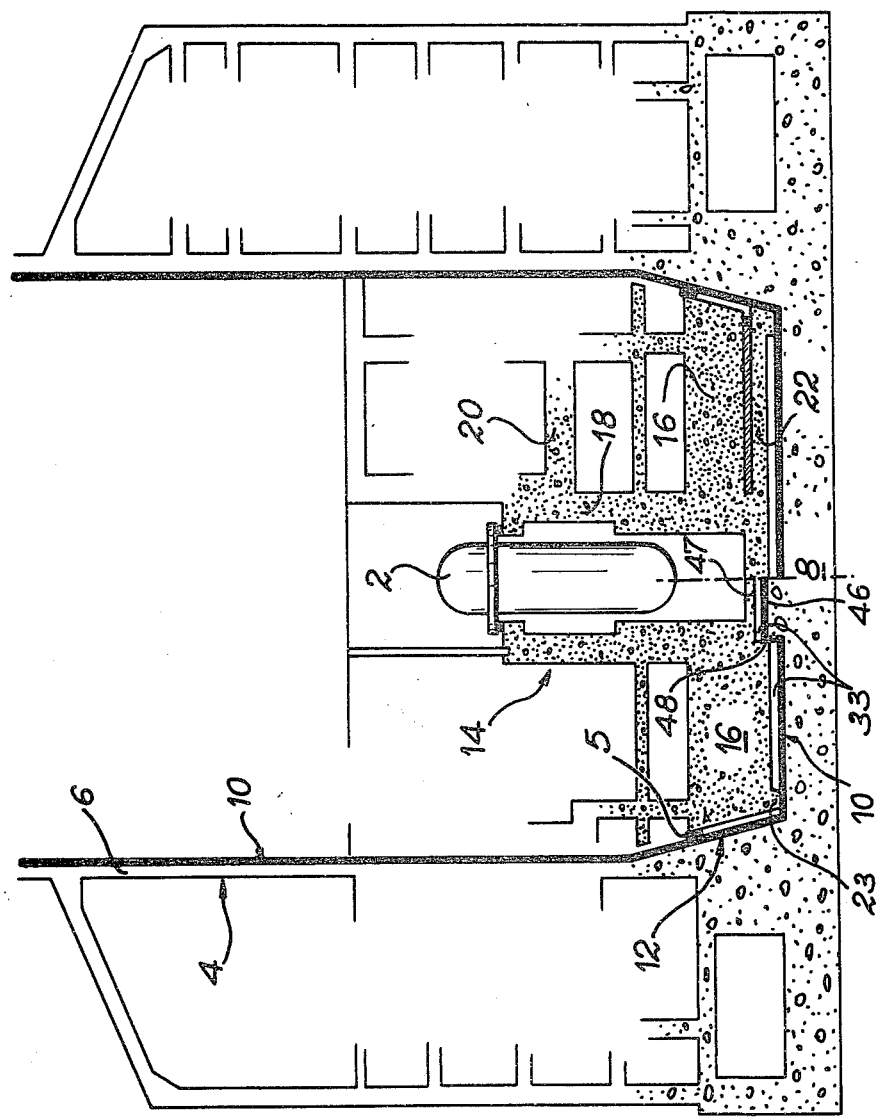
FIG. 1 two sectional half-views of the complete reactor building, the left-hand half-view representing a first embodiment with an internal structure floor in one piece positioned by the central part, the right-hand half-view showing another embodiment in which the internal structure floor comprises a slab.
Figure 2:
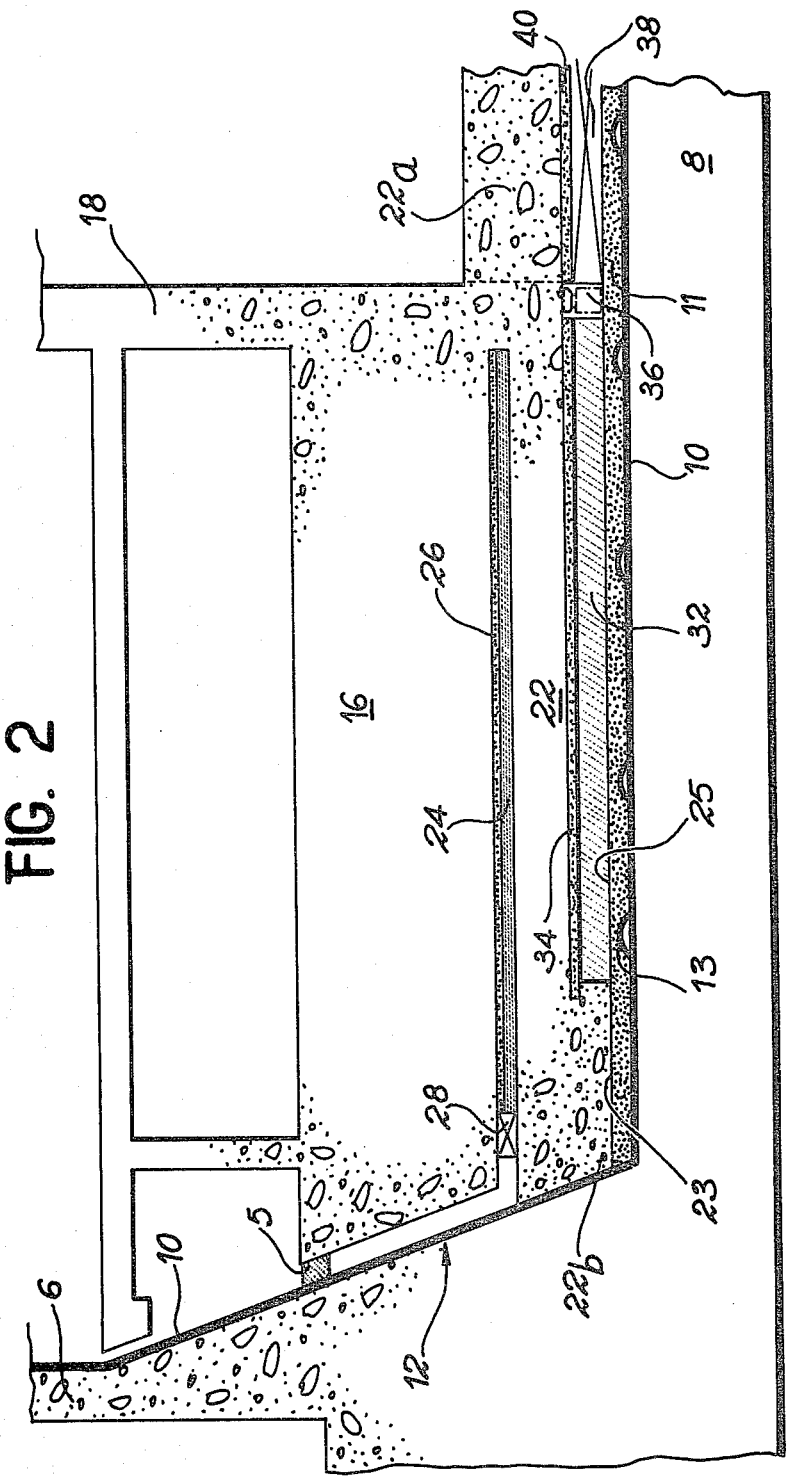
FIG. 2 a partial sectional view of the first embodiment.

FIG. 1 is a sectional view of a reactor building with an arrangement of the internal structures according to the invention. The reactor vessel 2 is disposed within a confinement enclosure 4. The latter comprises a cylindrical skirt 6, a general floor 8 and a not shown dome sealing the upper part of the enclosure. The confinement enclosure 4 is sealed by a mild steel covering 10, also called a skin. The lower part of cylindrical skirt 6 is connected to general floor 8. This connection can be in the form of a frustum-shaped member 12, as shown in FIGS. 1 and 2, but can also be cylindrical.

The concrete internal structures 14 are installed in confinement enclosure 4 and mainly support the components of the primary circuit. These structures comprise an internal structure floor 16, a cylindrical cylinder 18, called the vessel shaft and which supports the reactor vessel 2 being positioned substantially in the centre of floor 16, and hot cells 20 arranged in radiating manner with respect to the vessel shaft 18 to which they are joined. The internal structures are generally disengaged from the confinement enclosure. A gasket 5, e.g. of styrene, is positioned between the enclosure and the internal structures. The internal structure floor can be positioned in the confinement enclosure in a number of different ways.

According to a first version positioning is achieved by keying the central part of the internal structure floor to the general floor. This keying ensures the relative horizontal locking of the said structures, whilst permitting their free expansion. In this version, shown in the left-hand part of FIG. 1, the general floor 8 has a circular projection 46, which projects above the floor and is covered by the sealing skin 10. The internal structure floor 16 has in a facing position a circular recess 47 cooperating with projection 46 by a vertical circular ring 48. Thus, horizontal locking is obtained, whilst permitting relative vertical displacements between the floors. The free space 33 between internal structure floor 16 and general floor 8 exists over the entire surface of the latter, including to the right of the projection, with the exception of the peripheral supporting ring 23. According to a second version shown in the right-hand part of FIG. 1, the internal structure floor 16 has a slab 22 which is disengaged from the latter by means of a horizontal joint 24 constituted by a sliding product. This ring-like joint extends from the vessel shaft 18 between slab 22 and floor 16. The thickness of slab 22 is the minimum compatible with the seismic stresses to be transmitted in order to limit the thermal pressure exerted by the slab on member 12.

According to the invention, the two versions of the reactor buildings shown in FIG. 1 have in each case a space 33 between general floor 8 and internal structure floor 16. This space makes the stresses in the internal structures independent of the deformations of the general floor. A description will be given hereinafter, with reference to FIGS. 3 to 5, of different ways of constructing space 33 so as to obtain the aforementioned independence.

FIG. 2 is a part sectional view showing the first embodiment. It shows general floor 8, the mild steel covering 10 ensuring the sealing of confinement enclosure 4, the concrete layer 12 protecting the skin and the channels 13 coated in a protective layer 11 in order to make it possible to check or inspect the welds of skin 10. It is also possible to see connection 12 between the lower part of cylindrical skirt 6 of confinement enclosure 4 and the general floor 8. Slab 22 has a central portion 22a facing the vessel shaft and a peripheral portion 22b locked against member 12 of the confinement enclosure. Slab 22 only rests on the general floor by a peripheral supporting ring 23 of relatively reduced width which, in the centre of ring 23, defines a circular surface 25 of general floor 8, which is not in contact with the internal structure floor 16.

According to this embodiment of the invention space 33 is constituted by a compressible layer 32 arranged over the entire surface 25. A vinyl sheet 34 placed above the compressible layer 32 protects it during the production of slab 22.

The invention also relates to a process for producing the internal structure shown in FIG. 2. General floor 8, sealing covering 10 and the protective layer 11 for said covering are produced according to this process. The compressible layer 32 and its protective sheet 34 are placed on annular surface 25 positioned between supporting ring 23 and that part of the floor to the right of vessel shaft 18. The peripheral supporting ring 23 is concreted and it is then possible to either place a disposable shuttering on protective sheet 34 or concrete a slab which will support the fresh concrete of the internal structure floor.

In order to limit the inertia of this shuttering or slab, provisional shims 36 are placed around the entire surface facing portion 22a of slab 22. The concreting of the internal structures is then continued, with the exception of central portion 22a which will be cast subsequently.

When the internal structures have a sufficient inertia to be self-supporting on their peripheral supporting ring 23, it is possible to remove shims 36 by means of not shown jacks. The shims and jacks are removed by the circular opening existing at this stage of the production of the internal structures in place of the central portion 22a. A second compressible layer 38 is placed on general floor 8 facing portion 22a. A non-reinforced cement mortar cover 40 is then produced on compressible cushion 38. It is then possible to concrete portion 22a of the slab. Waiting fittings are provided at the bottom of the vessel shaft skirt in order to join together the two structures.

Figure 3:
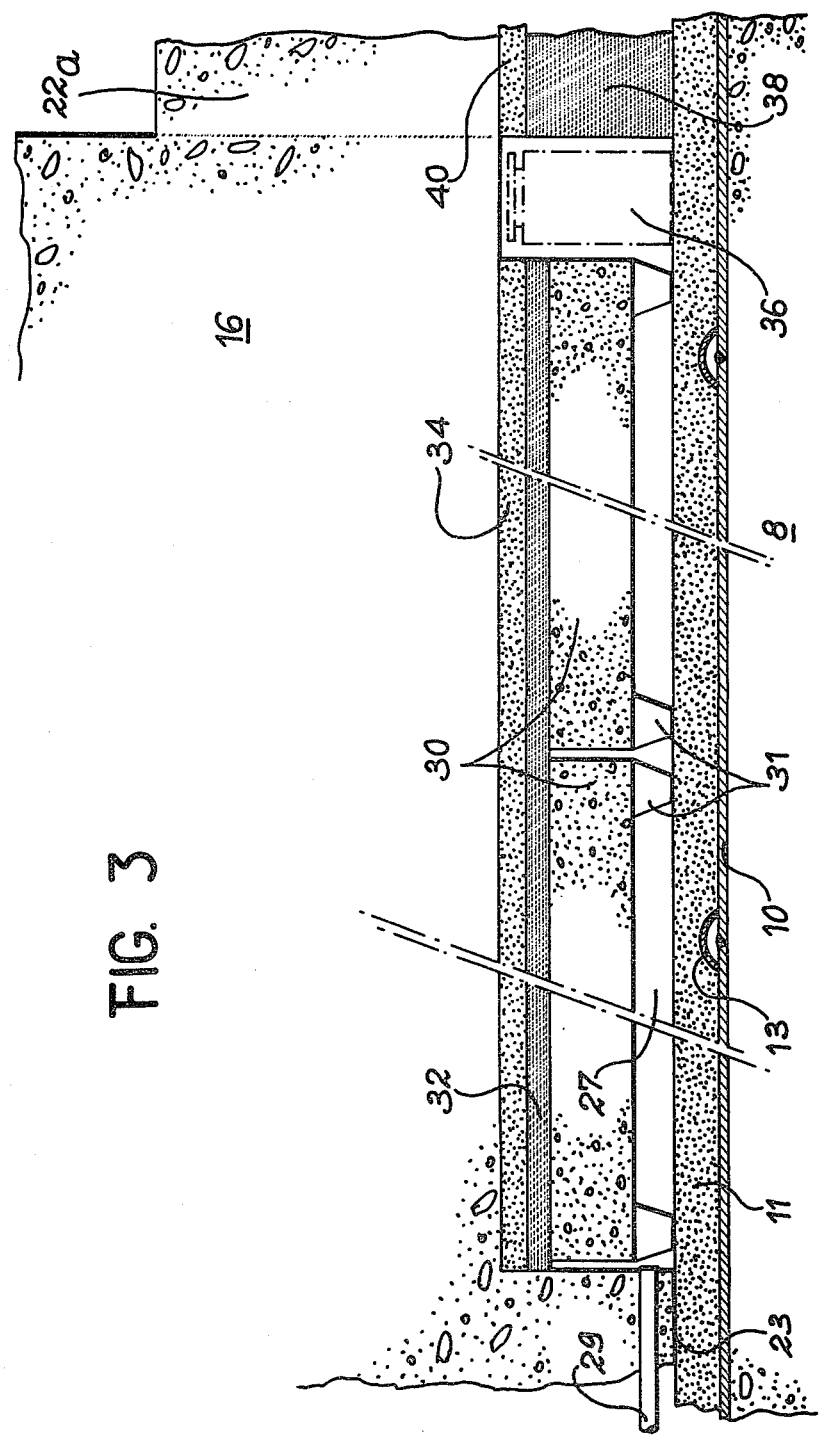
FIG. 3 a second embodiment.

FIG. 3 shows a second embodiment of the invention, which has preslabs 30 arranged over the entire surface 25, with the exception of the circle facing vessel shaft 18. These preslabs 30 rest on the general floor by four bearing points 31. Thus, between general floor 8 and preslabs 30, a free space 27 is formed, which is connected to the atmosphere of the enclosure by a venting system 29. In the case of an accident, this arrangement makes it possible to balance the pressure on either side of the internal structure floor 16. Thus, in the case of a reference accident, the effective pressure on the internal structure floor is zero and the pressure effect is transferred to the general floor 8.

Moreover, in order to ensure the independence of the stresses in the internal structures from the deformations of the general floor, a compressible layer 32 e.g. of polystryrene with a vinyl protection is placed over the entire surface of preslabs 30. The function of compressible layer 32 is to absorb the relative deformations which tend to move together general floor 8 and internal structure floor 16 and thus fulfils the function of space 33 described in the first embodiment. A vinyl sheet 34 placed above compressible layer 32 protects it during the formation of slab 22.

The invention also relates to a process for producing the internal structures shown in FIG. 3. General floor 8, the mild steel sealing covering 10 and the protective layer 11 for this covering are produced by this process. The preslabs 30 are then placed on the annular surface defined by the peripheral supporting ring 23 of the slab on the general floor on the outside and on the inside by the surface of the general floor facing slab portion 22a. The compressible layer 32 is placed on preslabs 30 and then a vinyl protective sheet 34 is placed on compressible layer 32. The peripheral supporting ring 23 is then concreted. Shims 36 are placed around the entire surface facing slab portion 22a. The provisionally installed shims 36 prevent the exhaustion of the deformation capacity of compressible layer 32 during the construction of the internal structures. A disposable shuttering can be placed on protective sheet 34 or it is possible to concrete a slab which will support the fresh concrete of slab 22. The concrete of slab 22 is then cast, with the exception of the central portion 22a, which will be subsequently cast. When the internal structures have a sufficient inertia to be self-supporting on peripheral supporting ring 23, it is possible to remove the shims 36 by means of the not shown jacks. The shims and jacks are removed through the circular opening existing at this stage of the construction of the internal structures in the position of central portion 22a. A second compressible layer 38 is then placed on general floor 8 facing portion 22a. A non-reinforced, cement mortar cover 40 is then produced on compressible cushion 38. It is then possible to concrete slab portion 22a. Waiting fittings are provided at the bottom of the vessel shaft skirt in order to join together the two structures.

Figure 4:
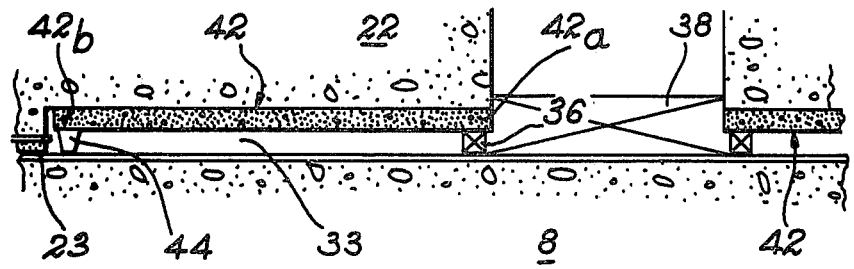
FIGS. 4 and 5 a third embodiment of the invention.
Figure 5:
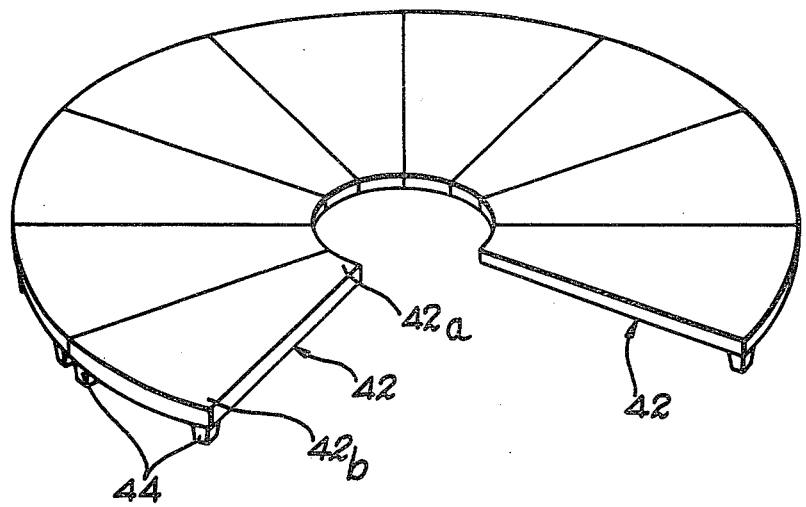

FIGS. 4 and 5 show a third embodiment of the invention. According to this embodiment, space 33 for the disengagement of the general floor and the internal structures is obtained by means of large preslabs 42 in the form of circular sectors. These preslabs have two peripheral bearing points 44. They have no bearing point in their central portion 42a. Shims 36, which are more particularly visible in FIG. 4, take the place of the bearing points during the construction of the internal structures and specifically until the latter are sufficiently rigid to carry their own weight. As can be seen in FIG. 5, the preslabs 42 are juxtaposed so as to cover the complete annular surface between the peripheral supporting ring 23 of slab 22 and the surface of the general floor 8 facing the vessel shaft. They define the free space 33 which, like space 27 of the second embodiment, is connected to the atmosphere of the confinement enclosure 4 by a venting system 29. These preslabs 42 are sufficiently rigid to support their own weight, together with that of the fresh concrete of slab 22. In this embodiment, the compressible layer 32, necessary in the case of the second embodiment does not exist in view of the fact that preslabs 42, unlike preslabs 30, do not have intermediate bearing points and consequently do not transmit the deformations of general floor 8 to the internal structures. Conversely, it is pointed out that the compressible layer 38 facing the vessel shaft also exists in this third embodiment.

The invention also relates to a process for producing the internal structures described hereinbefore with reference to FIGS. 4 and 5. According to this process, the preslabs 42 are juxtaposed, in the manner shown in FIG. 5, on the general floor surface between the peripheral supporting ring 23 of slab 22 and the surface facing the vessel shaft, bearing shims 36 being placed beneath the end 42a of preslabs 42. A start is then made with the concreting of the internal structures, with the exception of area 22a facing the vessel shaft. When the internal structures are sufficiently rigid to be self-supporting on their peripheral supporting ring 23, shims 36 are removed by means of not shown jacks via the central opening existing at this stage of the production of the slab.

Space 27 of 33 can be drained or dried after an accident. It is connected to the enclosure scavenging system by means of a tube embedded in the internal structure floor, the air being extracted by venting pipes 28.

If the compressible layer is made from polystyrene over the course of time it may be subject to degradation either in the form of a slow auto-degradation with the emission of gases, or under the action of chemical agents obtained in the recirculation water. However, bearing in mind the composition of the polystyrene, this degradation does not constitute therefore any particular disadvantage. The disappearance of the compressible layer may even facilitate the satisfactory operation of the internal structures and in particular the independence between deformations of the internal structures and those of the general floor.

The internal structures described hereinbefore function in the following way. In the case of an accident, the venting system places the free space 27 or 33 beneath the preslab under the pressure of the confinement enclosure 4. This pressure is transmitted to the lower surface of the internal structure floor by the compression of the layer system constituted by the preslab, the compressible layer and its non-reinforced protective cover when these are provided (second embodiment) and optionally slab 22, horizontal joint 24 constituted by a sliding product and its non-reinforced, cement mortar protective cover 26.

What is claimed is:

1. A reactor building constituted by a confinement enclosure in which are positioned by a known centering means the internal structures, said confinement enclosure comprising a cylindrical skirt, whose upper part is sealed by a dome and erected on the general floor, the internal structures being constituted by the internal structure floor, a concrete cylinder called the vessel shaft located substantially in the centre of the internal structure floor, and hot cells, wherein the lower part of the internal structure floor rests on the general floor by means of a peripheral support ring, a space being provided between the general floor and the internal structure floor.

2. A reactor building according to claim 1, comprising a compressible layer formed by parts between the general floor and the internal structure floor over the entire circular surface within the peripheral supporting ring.

3. A reactor building according to claim 1, comprising three slabs positioned between the general floor and the internal structure floor, the preslabs resting on the general floor by at least three bearing points and covering the entire circular surface located within the peripheral supporting ring, with the exception of that part of the general floor facing the vessel shaft, a compressible layer being placed above the preslabs and a non-reinforced cement mortar cover protects the compressible layer during the formation of the internal structure floor, a venting system connecting the free space to the atmosphere of the confinement enclosure.

4. A reactor building according to claim 1, comprising preslabs shaped like ring sectors and able to support their own weight partly or wholly increased by that of the fresh concrete of the internal structure floor, said preslabs resting on the general floor by means of supports provided only in their peripheral portions so as to define a space between the general floor and the internal structure floor, a venting system connecting the free space to the atmosphere of the confinement enclosure.

5. A reactor building according to claim 1, wherein the compressible layer is made from polystyrene.

6. A process for the construction of the internal structures of a reactor building according to claims 1 or 2, wherein on the general floor is placed a compressible layer and its protective sheet on the annular surface between the supporting ring and that part of the floor to the right of the vessel shaft, the peripheral supporting ring is concreted, provisional shims are arranged around the entire surface facing the portion of the internal structure floor, on the protective sheet is placed an annular device carrying the first concrete batch between the peripheral supporting ring and the provisional shims, the concrete of the slab is cast, with the exception of the central area, the shims are removed with jacks as soon as the internal structures have an adequate inertia to be self-supporting on their peripheral supporting ring, the shims and jacks are removed, a compressible layer is placed on that part of the general floor facing the vessel shaft, the non-reinforced, cement mortar cover is cast on the compressible layer and that portion of the slab facing the vessel shaft is cast.

7. A process for the production of internal structures of a reactor building according to claim 3, wherein the preslabs are placed on the general floor in the ring externally defined by the peripheral supporting area of the slab and internally by the circular surface of the floor facing the vessel shaft, shims being positioned facing the slab portion, the compressible layer with its protective sheath will fit it, on the protective sheet is placed an annular device carrying the first concrete batch between the peripheral supporting ring and the provisional shims, the concrete of the slab is cast, with the exception of the central area, the shims are removed with jacks as soon as the internal structures have an adequate inertia to be self-supporting on their peripheral supporting ring, the shims and jacks are moved, a compressible layer is placed on that part of the general floor facing the vessel shaft, the non-reinforced, cement mortar cover is cast on the compressible layer and that portion of the slab facing the vessel shaft is cast.

8. A process for producing internal structures of a reactor building according to claim 4, wherein the preslabs with their shims are placed on the general floor, the concrete of the slab is cast, with the exception of the central area, the shims are removed with jacks as soon as the internal structures have an adequate inertia to be self-supporting on their peripheral supporting ring, the shims and jacks are removed, a compressible layer is placed on that part of the general floor facing the vessel shaft, the non-reinforced, cement mortar cover is cast on the compressible layer and that portion of the slab facing the vessel shaft is cast.

* * * * *